US006506850B1

(12) United States Patent
Tanimura et al.

(10) Patent No.: US 6,506,850 B1
(45) Date of Patent: Jan. 14, 2003

(54) POLYOXYMETHYLENE COPOLYMER AND COMPOSITION THEREOF

(75) Inventors: Noritaka Tanimura, Kurashiki (JP); Atushi Nanasawa, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/763,372

(22) PCT Filed: Sep. 21, 1999

(86) PCT No.: PCT/JP99/05138

§ 371 (c)(1),
(2), (4) Date: Feb. 21, 2001

(87) PCT Pub. No.: WO00/17247

PCT Pub. Date: Mar. 30, 2000

(30) Foreign Application Priority Data

Sep. 24, 1998 (JP) ............................................ 10-285894

(51) Int. Cl.$^7$ ........................... C08L 61/02; C08G 65/34
(52) U.S. Cl. ....................... 525/398; 525/337; 525/472; 528/234; 528/241; 528/425; 528/486; 528/492
(58) Field of Search ................................ 525/398, 337, 525/472; 528/234, 241, 425, 486, 492

(56) References Cited

U.S. PATENT DOCUMENTS

| 4,107,056 A | 8/1978 | Violland et al. |
| 4,956,445 A | 9/1990 | Yamamoto et al. |
| 5,288,840 A | 2/1994 | Morishita et al. |
| 5,344,911 A | 9/1994 | Yamamoto et al. |
| 5,587,449 A | 12/1996 | Fleischer et al. |
| 5,866,670 A | 2/1999 | Nakai et al. |

FOREIGN PATENT DOCUMENTS

| JP | 52-10398 | | 1/1977 |
| JP | 55-115441 | A | 9/1980 |
| JP | 63-27519 | | 2/1988 |
| JP | 63-27519 | A | 2/1988 |
| JP | 1-170610 | A | 7/1989 |
| JP | 6-86509 | B2 | 9/1991 |
| JP | 4-108848 | A | 4/1992 |
| JP | 4-145115 | A | 5/1992 |
| JP | 5-5017 | A | 1/1993 |
| JP | 5-98027 | A | 4/1993 |
| JP | 5-98028 | A | 4/1993 |
| JP | 5-247158 | A | 9/1993 |
| JP | 8-59767 | A | 3/1996 |
| JP | 8-73549 | A | 3/1996 |
| JP | 8-325341 | A | 12/1996 |
| JP | 9-59332 | A | 3/1997 |
| JP | 11-43584 | A | 2/1999 |
| JP | 11-51154 | A | 2/1999 |
| SG | 39103 | | 9/1998 |
| WO | 9613548 | A1 | 5/1996 |
| WO | 9842781 | A1 | 10/1998 |

*Primary Examiner*—Duc Truong
(74) *Attorney, Agent, or Firm*—Birch, Stewart, Kolasch & Birch, LLP

(57) ABSTRACT

A polyoxymethylene copolymer having a melting point of 167° to 173° C. and containing a low molecular weight polyoxymethylene copolymer in an amount of not higher than 5000 ppm, and a composition thereof. The copolymer is obtainable by subjecting unstable terminal groups to heat treatment in the presence of 0.05 to 50 ppm by weight of a quaternary ammonium compound. Further, the above composition is used for working parts such as a gear and a cam; apparatuses for image, music and telecommunication; interior and exterior parts for an automobile; and the like.

31 Claims, No Drawings

POLYOXYMETHYLENE COPOLYMER AND COMPOSITION THEREOF

This application is the national phase under 35 U.S.C. §371 of PCT International Application No. PCT/JP99/05138 which has an International filing date of Sep. 21, 1999, which designated the United States of America.

TECHNICAL FIELD

The present invention relates to a polyoxymethylene copolymer which not only exhibits a high crystallization rate, high stiffness and excellent thermal stability but also has excellent secondary shrinkage and gas barrier properties to organic solvent gases, and to a composition thereof.

BACKGROUND ART

A polyoxymethylene resin is a polymer material which is widely used for electrical and electronic apparatus parts, automobile parts, and the like since it is easily crystallizable, and molded products thereof are excellent in mechanical properties such as stiffness, thermal resistance and creep resistance. However, oxymethylene units constituting the polyoxymethylene resin are thermally unstable. Therefore, for the purpose of preventing chain by chain depolymerization which starts from unstable terminal groups, the polyoxymethylene resin is usually applied to practice after thermal stability thereof has been generally improved, by copolymerizing a cyclic ether or a cyclic formal having oxyalkylene units capable of introducing carbon-carbon bonds in polymer chains such as ethylene oxide, propylene oxide, 1,3-dioxolane, 1,4-butane diol formal, and further compulsorily removing unstable molecular ends.

Since the oxyalkylene unit decreases the crystallization temperature of the copolymer, the commercial polyoxymethylene copolymer has a melting point of about 160° to 165° C. while the polyoxymethylene homopolymer without oxyalkylene units has that of higher than 170° C. Further, at the cooling step during molding, crystallization does not sufficiently proceed, and the stiffness which is highly dependent on the degree of crystallinity also decreases in general according to the increase of oxyalkylene units. Accordingly, there has been a demand for a polyoxymethylene copolymer which has a low content of the oxyalkylene units, has high thermal resistance and high stiffness, and exhibits sufficient thermal stability even if the content of the oxyalkylene units is decreased.

For the purpose of solving the above problems, as attempts to put into practical use a copolymer having a low content of an oxyalkylene unit and being excellent in stiffness, Japanese Patent Publication Examined No. 6-86509 and Japanese Patent Publication Unexamined No. 5-5017 (corresponding U.S. Pat. No. 5,288,840) propose a technology to make the distribution of polymer chains as uniform as possible and provide the polymer chain terminals, which becomes a starting point of thermal decomposition, with specific substituents. Japanese Patent Publication Unexamined No. 4-145115 proposes to synthesize polymers according to the same viewpoint as the above prior art and make harmless by neutralization components which accelerates decomposition of the polymer chain.

According to these technologies, there surely can be obtained a material which is excellent in tensile strength and resistance to alkali chemicals, is difficult to be thermally decomposed, and exhibits less reduction in strength when left under high temperature circumstances. However, the polyoxymethylene copolymer according to these technologies is produced by having focused on improving the thermal stability in the region where the amount of copolymer comonomer is small, and, as to the improvement of mechanical properties, only the comonomer amount is reduced as a means thereof. Therefore, from the standpoint of improving the stiffness as a mechanical property, there has remained room for improvement.

As for the proposals to enhance the crystallization rate of polyoxymethylene resins having a normal melting point, for example, Japanese Patent Publication Unexamined Nos. 08-59767 and 08-325341 disclose production methods using 1,3-dioxolane as a comonomer and a specific amount of a polymerization initiator. However, even though the range of the comonomer amount and the relatively high range of the amount of the polymerization initiator used disclosed in these prior documents can improve the polymerization yield, which is targeted therein, they are not sufficient to satisfy the demand for the essential improvement in stiffness since the melting point of the copolymer itself is too low.

Moreover, since the polyoxymethylene resin is a crystalline resin, dimensional changes occur due to post shrinkage, i.e., secondary shrinkage, when the resin is left for a long time or is exposed to the atmosphere of high temperatures after being molded. As a result, the polyoxymethylene resin cannot avoid such a drawback that the application thereof to precision parts is limitative. As a method for improving secondary shrinkage thereof, a method of formulating inorganic fillers has been conventionally known. However, the polyoxymethylene resin composition, wherein inorganic fillers are formulated, is not only inferior in mechanical properties, especially elongation and impact resistance, but also has drawbacks such as poor moldability, low strength at weld parts, and therefore it has a drawback that it is unsuitable for the material of precision parts. As other methods, for example, Japanese Patent Publication Unexamined No. 4-108848 proposes to achieve low secondary shrinkage by blending a polyoxymethylene homopolymer and a polyoxymethylene random copolymer at a predetermined ratio. However, this method employs a polyoxymethylene homopolymer which is essentially poor in thermal stability so that the resultant polymer does not exhibit sufficient thermal stability.

On the other hand, the polyoxymethylene resin is a crystalline resin having an extremely high degree of crystallinity. Therefore, it can be said a resin which, in general, is unlikely to permeate an organic solvent gas, has excellent organic solvent gas barrier properties. For instance, a polyoxymethylene resin, which does not permeate butane, propane, and the like, would be an excellent material for use as a pressure vessel, such as a gas lighter. In view of the recent rising demand for energy saving relating to the earth's environmental problems, lightening of automobile parts with the use of resins, especially fuel related parts of automobile, has been accelerated, and further improvement in the gas barrier property of the resins to automobile fuels such as gasoline and methanol has been required.

DISCLOSURE OF THE INVENTION

The present inventors have found that a polyoxymethylene copolymer having a melting point not lower than 167° C. and not higher than 173° C., wherein a low-molecular weight polyoxymethylene copolymer which is contained in the polyoxymethylene copolymer and is extractable with chloroform is not more than 5000 ppm, exhibits not only high stiffness and excellent thermal stability but also has excellent secondary shrinkage and organic solvent gas barrier properties. As a result, the present invention has been accomplished.

Namely, the present invention relates to a polyoxymethylene copolymer having a melting point not lower than 167° C. and not higher than 173° C., wherein a low-molecular weight polyoxymethylene copolymer which is contained in the polyoxymethylene copolymer and is extractable with chloroform is not more than 5000 ppm, and to a polyoxymethylene resin composition containing the polyoxymethylene copolymer, further comprising, based on 100 parts by weight of the polyoxymethylene copolymer, (A) 0.01 to 5 parts by weight of at least one selected from the group consisting of an antioxidant, a polymer or a compound containing a formaldehyde reactive nitrogen or a catching agent of formic acid, a weathering (light) stabilizer, a mold release agent (a lubricant), and a crystalline nucleating agent, (B) 0 to 60 parts by weight of at least one selected from the group consisting of a reinforcing material, and an electrically conductive material, a thermoplastic resin, and a thermoplastic elastomer, and (C) 0 to 5 parts by weight of a pigment.

Further, the present invention provides a molded product obtainable by subjecting the polyoxymethylene copolymer or the composition thereof to injection molding, extrusion molding, blow molding, or pressure molding; a part obtainable by subjecting the polyoxymethylene resin composition to injection molding, extrusion molding, blow molding, or pressure molding, or further subjecting the molded product to processing of cutting after the molding; a working part such as a gear, a cam, a slider, a lever, an arm, a clutch, a joint, an axis, a bearing, a key-stem, a key-top, a shutter, a reel, a part mating and sliding with a leading screw which drives a pick-up for an optical disc drive, a gear which rotates a leading screw, a rack gear which drives a pick-up, and a gear which mates with the rack gear and drives it; a resinous part by outsert molding; a resinous part by insert molding; a chassis; a tray; a side plate; and the like. These parts are particularly used for office automation (OA) apparatuses represented by a printer and a copying machine; for cameras and video apparatuses represented by a video tape recorder (VTR), a video movie, a digital video camera, a camera, and a digital camera; for apparatuses for music, image, or information represented by a cassette player, a laser disc. (LD), a digital audio tape (DAT), a mini disc (MD), a compact disc (CD) [including CD-ROM (read only memory), CD-R (recordable) and CD-RW (rewritable)], a digital video disc (DVD) [including DVD-ROM, DVD-R, DVD-RW, DVD-RAM (random access memory) and DVD-Audio], other optical disc drives, a micro floppy disc (MFD), a magnet optical disc (MO), a navigation system, and a mobile personal computer; for telecommunication apparatuses represented by a cellular phone and a facsimile machine; for interior or exterior parts for an automobile such as fuel related parts represented by a gasoline tank, a fuel pump module, valves, and a gasoline tank flange, door related parts represented by a door lock, a door handle, a window regulator, and a speaker grille, seat belt related parts represented by a slip ring for a seat belt and a press bottom, parts for a combination switch, switches, and clips; and for miscellaneous industrial goods represented by a disposable camera, a toy, a fastener, a chain, a conveyor, a buckle, sporting goods, a vending machine, furniture, an instrument and an apparatus for house-building.

BEST MODE FOR CARRYING OUT THE INVENTION

The present inventors made intensive and extensive studies. As a result, they unexpectedly found the fact that low molecular weight components existing in the polyoxymethylene copolymer greatly influence the stiffness, thermal stability, secondary shrinkage, and the organic solvent gas barrier properties, particularly in the compositional region where the amount of the comonomer used is small. Although a specific mechanism of such a phenomenon is not clear, this is supposed to be presumably because the existence of an oligomer affects the crystallization temperature, the crystallization rate or the like so that the degree of crystallinity or the crystal structure is changed.

Although it is not apparent where the oligomer is generated, it is supposed that both of the polymerization process and the decomposition process of unstable parts of the terminal group of the copolymer participate. Particularly, when a specific unstable terminal group is decomposed using a specific amount of a specific cation polymerization catalyst and a specific comonomer, a desirable copolymer containing a smaller amount of oligomer can be obtained.

Specifically, the copolymer of the present invention which is excellent in stiffness, secondary shrinkage, and an organic solvent gas barrier property can be obtained by preferably copolymerizing trioxane and 1,3-dioxolane, and is characterized in that the melting point is not lower than 167° C. and not higher than 173° C., and the amount of the lower molecular weight polyoxymethylene which is extractable with chloroform is not more than 5000 ppm.

Hereinafter, the present invention is described in detail.

The polyoxymethylene copolymer of the present invention having a melting point of 167° to 173° C. can be synthesized by reducing the amount of the comonomer to be copolymerized with trioxane against the normal polyoxymethylene copolymer having a melting point of 160° to 165° C. However, when the synthesis is carried out without special technical attention, a copolymer practically worthwhile cannot be obtained. This is proved by the fact that no product made of a polyoxymethylene copolymer having the melting point falling in this region has existed. The task of the present invention is to improve stiffness of the copolymer without deteriorating thermal stability as compared with conventional technology. The present inventors have made studies to maintain thermal stability of the copolymer by introducing comonomer components in as small an amount as possible. As a result, they succeeded in. improving stiffness itself while maintaining thermal stability, and at the same time in improving secondary shrinkage and the organic solvent gas barrier properties.

In general, when a polyoxymethylene copolymer having high stiffness, that is, having a higher degree of crystallinity, is tried to obtain, it is more preferable as a crystallization starting temperature, i.e., a melting point, is higher. This is probably because the crystallization starts in a high temperature state where a resinous viscosity is still low (in a high fluidity state) at a cooling step of molding, and therefore, the arrangement of molecular chains proceeds more promptly. The polyoxymethylene copolymer of the present invention having excellent stiffness is such a copolymer that has a melting point of not lower than 167° C. and not higher than 173° C., preferably not lower than 167° C. and not higher than 171° C. When the melting point is lower than 167° C., the stiffness is not sufficiently improved. When it is higher than 173° C., it is necessary to add a large amount of a thermal stabilizer and the like for securing practically sufficient thermal stability, so that the melting point thereof is unfavorably substantially lowered.

It has been well known to the public that the melting point of the polyoxymethylene copolymer is determined mainly by the comonomer content, and the melting point therefore mainly controls the crystallization rate and further controls the degree of crystallinity of the resultant molded product, i.e., the stiffness of the product, when the composition is molded. The present inventors have found that the oligomer in the copolymer also influences the crystallization rate. Namely, in the high melting point region where a comonomer content is small, the composition containing a larger amount of oligomer exhibits a decreased crystallization rate so that the degree of crystallinity, accordingly, stiffness, is reduced even if the copolymers have the same comonomer content. The polyoxymethylene resin has not been noticed until today since it is a highly crystallizable polymer material as compared with polyamide resins or polyolefin resins. However, the present inventors have found the fact that the oligomer influences stiffness. Further, they have also unexpectedly found that the oligomer has a great influence on secondary shrinkage and an organic solvent gas barrier property.

The oligomer of the present invention means a component extracted from the powder of the polyoxymethylene resin composition at the side of soluble matters during 24 hour Soxhlet extraction using chloroform. According to a proton NMR and a mass spectrometric analysis, the main component of the oligomer is a compound having a tetramer to a hexadecamer of formaldehyde, which means a compound having a molecular weight of about 120 to 480. In order for the copolymer of the present invention to maintain the excellent stiffness, an allowable oligomer amount is not more than 5000 ppm, preferably not more than 3000 ppm. Ideally, it is required not to contain oligomer at all. However, in the range of the production technology, practical in industry, it is unrealistic, for instance, to make the amount of the polymerization initiator extremely small for maintaining the polymerization rate. Therefore, it cannot be avoided to contain the oligomer in an amount of not less than 100 ppm. In a laboratory, it is possible to conduct a step for extracting and removing the oligomer from products such as a pellet using a solvent for the purpose of reducing it. However, considering the labor hours accompanied by this step, value deterioration as an industrial product cannot be avoided. In other words, the composition which is worth being applied to practical use contains the oligomer in an amount of not less than 100 ppm and not more than 5000 ppm, preferably not less than 100 ppm and not more than 3000 ppm.

When a commercial polyoxymethylene resin material is subjected to the above-described analysis, various additives including an antioxidant are extracted together with the oligomer components. These additives are also thought to be in relation to decrease of the crystallization rate. However, even, for instance, the antioxidant represented by a hindered phenol is added in a usual amount, a large reduction in stiffness is not observed.

The first feature of an industrially producing method of the present invention is a selection of a comonomer to be used for the copolymerization. The comonomer used in the polyoxymethylene copolymer includes ethylene oxide, propylene oxide, 1,3-dioxolane, 1,4-butandiol formal, and the like. Generally, usual polyoxymethylene copolymers having a melting point of 160° to 165° C. do not exhibit remarkable difference in characteristic properties of the compositions thereof depending upon differences of sorts of the comonomers. In the case of the copolymer of the present invention having a melting point of 167° to 173° C., 1,3-dioxolane is particularly effective for synthesis of a composition containing less amount of the oligomer. Among 1,3-dioxolane, a 1,3-dioxolane having an acetaldehyde content of preferably not more than 2000 ppm, more preferably not more than 1000 ppm, particularly preferably not more than 200 ppm, is effective. When the acetaldehyde content is over 2000 ppm, it is difficult to prepare a composition with a small amount of the oligomer. The amount of the comonomer used for the polymerization of the copolymer of the present invention is 0.0015 to 0.025 mol, preferably 0.002 to 0.02 mol, more preferably 0.003 to 0.018 mol, based on 1 mol of trioxane.

Secondly, the type and the amount of a cationic polymerization catalyst used for the polymerization are important. In the present invention, it is effective to use, as a polymerization catalyst, at least one selected from the group consisting of boron trifluoride, a hydrate of boron trifluoride, and a complex compound coordinating an organic compound containing an oxygen atom or a sulfur atom and boron trifluoride. Among them, boron trifluoride diethyl ether and boron trifluoride di-n-butylether are preferably exemplified. In general, the amount of the polymerization catalyst used in the synthesis of polyoxymethylene is decided in view of a polymerization rate and a molecular weight of a product. In the present invention, the amount of the oligomer also influences the amount of a catalyst, and there exists a range of the usable amount of the polymerization catalyst suitable for obtaining a copolymer with less amount of the oligomer. Specifically, a preferable range of the polymerization catalyst amount to be used is not less than 3 ppm and not-more than 30 ppm based on the produced weight of the copolymer. The catalyst amount defined herein is not a value obtained from a ratio of the portions of the reactive components prepared upon the polymerization, but a value obtained by analyzing the composition actually produced and converting the result while regarding boron trifluoride having been used as a polymerization catalyst. In the case that the amount of the polymerization catalyst used is either above or less than the suitable range, a copolymer having less oligomer is apt not to be obtained. There may be thought such a possibility that when the amount of the catalyst used is small, formaldehyde, which is not involved in the normal reaction, takes part in the production of an oligomer; on the contrary, when the amount of the catalyst used is large, formaldehyde, which is produced by decopolymerization due to the existence of an excess of catalyst, though it is once contained in a polymer chain, takes part in the production of an oligomer.

Thirdly, the heat treatment of an unstable terminal groups, which is conducted after the polymerization, is important, too. Production of an oligomer is thought to be reduced by carrying out this operation promptly. As a catalyst for this operation, a specified quaternary ammonium compound is preferably used. A preferable quaternary ammonium compound employed in the present invention is represented by the formula (1) below:

$$[R^1R^2R^3R^4N^+]_nX^{-n} \tag{1}$$

wherein:
each of $R^1$, $R^2$, $R^3$ and $R^4$ independently represents an unsubstituted or substituted $C_1$–$C_{30}$ alkyl group, a $C_6$–$C_{20}$ aryl group, an aralkyl group wherein an unsubstituted or substituted $C_1$–$C_{30}$ alkyl group is substituted with at least one $C_6$–$C_{20}$ aryl group, or an alkylaryl group wherein a $C_6$–$C_{20}$ aryl group is substituted with at least one unsubstituted or substituted $C_1$–$C_{30}$ alkyl group, wherein said unsubstituted or substituted alkyl group being linear, branched or cyclic, and said substituted alkyl group having at least one substituent selected from the group consisting of a halogen atom, a hydroxyl group, an aldehyde group, a carboxyl group, an amino group and an amide group, and wherein at least one hydrogen atom of each of said unsubstituted alkyl group, said aryl group, said aralkyl group and said alkylaryl group being optionally replaced by a halogen atom;

n represents an integer of from 1 to 3; and

X represents a hydroxyl group, or an acid residue of a $C_1$–$C_{20}$ carboxylic acid, a hydroacid excluding a hydrogen halide, an oxoacid, an inorganic thioacid or a $C_1$–$C_{20}$ organic thioacid. Among them, each of $R^1$, $R^2$, $R^3$ and $R^4$ in the formula (1) is independently preferably a $C_1$–$C_5$ alkyl group or a $C_2$–$C_4$ hydroxyalkyl group, more preferably at least one of $R^1$, $R^2$, $R^3$ and $R^4$ is a hydroxyethyl group. Specifically, there can be exemplified hydroxide of such as tetramethyl ammonium, tetraethyl ammonium, tetrapropyl ammonium, tetra-n-butyl ammonium, cetyl trimethyl ammonium, tetradecyl trimethyl ammonium, 1,6-hexamethylene bis(trimethylammonium), decamethylene-bis-(trimethylammonium), trimethyl-3-chloro-2-hydroxypropyl ammonium, trimethyl(2-hydroxyethyl)ammonium, triethyl(2-hydroxyethyl)ammonium, tripropyl(2-hydroxyethyl)ammonium, tri-n-butyl(2-hydroxyethyl)ammonium, trimethyl benzyl ammonium, triethyl benzyl ammonium, tripropyl benzyl ammonium, tri-n-butylbenzyl ammonium, trimethyl phenyl ammonium, triethyl phenyl ammonium, trimethyl-2-oxyethyl ammonium, monomethyl trihydroxyethyl ammonium, monoethyltrihydroxyethyl ammonium, octadecyl tri(2-hydroxyethyl) ammonium, and tetrakis(hydroxyethyl)ammonium; hydroacid salt such as hydrochloric acid, bromic acid, and fluoric acid; oxoacid salt such as sulfuric acid, nitric acid, phosphoric acid, carbonic acid, boric acid, chloric acid, iodic acid, silicic acid, perchloric acid, chlorous acid, hypochlorous acid, chlorosulfuric acid, amid sulfuric acid, disulfuric acid, and tripolyphosphoric acid; thioacid salt such as thiosulfuric acid; carboxylic acid salt such as formic acid, acetic acid, propionic acid, butyric acid, isobutyric acid, pentanoic acid, caproic acid, caprylic acid, capric acid, benzoic acid, and oxalic acid; and the like. Of these, hyroxide($OH^-$) and salts of sulfuric acid ($HSO_4^-$ and $SO_4^{2-}$), carbonic acid ($HCO_3^-$ and $CO_3^{2-}$), boric acid ($B(OH)_4^-$) and carboxylic acid are preferable. Among the carboxylic acids, a formic acid, an acetic acid and a propionic acid are particularly preferable. These quaternary ammonium compounds may be used alone or in combination. Further, in addition to the above quaternary ammonium compounds, amines such as ammonia and triethyl amine, which have been conventionally known as a decomposer for unstable terminal groups, may be used together. An amount of the quaternary ammonium to be added is preferably 0.05 to 50 ppm by weight in terms of the amount of nitrogen derived from the quaternary ammonium compound represented by the formula (2) below, based on the total weight of polyoxymethylene copolymer and the quaternary ammonium:

$$P \times 14/Q \qquad (2)$$

wherein P represents the amount (ppm by weight) of the quaternary ammonium compound, based on the total weight of the polyoxymethylene copolymer and the quaternary ammonium compound, numeral 14 is the atomic weight of nitrogen, and Q represents the molecular weight of the quaternary ammonium compound.

When the addition amount of the quaternary ammonium compound is less than 0.05 ppm by weight, the decomposing rate of unstable terminal groups is decreased. When it is more than 50 ppm by weight, the color of the polyoxymethylene copolymer deteriorates after the unstable terminal groups decompose. A preferable heat treatment is carried out at a resinous temperature of not lower than the melting point of the copolymer and not higher than 260° C. using an extruder, a kneader and the like. When the resinous temperature is higher than 260° C., there may cause problems in the coloring and the decomposition of the polymer main chain (decrease in a molecular weight). Formaldehyde generated during the decomposition is removed under a reduced pressure. A method for adding the quaternary ammonium compound is not particularly limited. There can be exemplified a method comprising adding the compound in an aqueous solution at the step for inactivating a polymerization catalyst, a method comprising blowing the compound to a copolymer powder, and the like. According to any method, it is acceptable if the compound has been added at the heat treatment step of the copolymer. In the case that the compound is charged into an extruder or that a filler or a pigment is formulated using an extruder or the like, it may be possible to attach the compound to resinous pellets and then conduct the decomposition of the unstable terminal groups at the following formulation step. The decomposition of the unstable terminal groups can be also conducted after a polymerization catalyst contained in a polyoxymethylene copolymer obtained by polymerization is inactivated, and it can be conducted without inactivating the polymerization catalyst. As a method for inactivating the polymerization catalyst, a method wherein the polymerization catalyst is inactivated by neutralization in a basic aqueous solution such as amines, can be exemplified as a representative example. Further, without inactivating the polymerization catalyst, the polyoxymethylene copolymer is heated at a temperature not higher than the melting point of the copolymer in an inert gas atmosphere to reduce the polymerization catalyst concentration by volatilization, and then the decomposition of the unstable terminal groups of the present invention may be carried out.

There is no particular limitation on the molecular weight of the copolymer of the present invention. Generally, the stiffness of a molded product depends on the degree of crystallinity, and the degree of crystallinity changes in accordance with a molecular weight of the copolymer and molding conditions. This is the same in the case of the copolymer of the present invention having a melting point of 167° to 173° C. The change in the crystallization rate caused by the difference in the molecular weights can be treated by controlling molding conditions. A crystalline nucleating agent may be added for the purpose of increasing not only the crystallization rate but also the degree of crystallinity of the copolymer of the present invention. By adding a crystalline nucleating agent in a small amount, further improvement in stiffness can be achieved.

To the polyoxymethylene copolymer, according to the present invention, publicly known additives, thermal stabilizers or the like may be added so long as the addition is not detrimental to the gist of the present invention. There is concern that the additives may decrease the crystallization rate as well as oligomers. However, even if the stiffness is sacrificed to some extent, such an adjustment of addition may be possible in the case wherein thermal stability is markedly improved or specific physical properties such as a sliding property is enhanced.

By formulating an appropriate additive to the polyoxymethylene copolymer of the present invention according to uses thereof, a polyoxymethylene resin composition excellent both in stiffness and thermal stability applicable to practical use can be obtained. Specifically, there can be exemplified a polyoxymethylene resin composition containing, based on 100 parts by weight of the polyoxymethylene copolymer, (A) 0.01 to 5 parts by weight of at least one selected from the group consisting of an antioxidant, a polymer or a compound containing formaldehyde reactive nitrogen, a catching agent of formic acid, a weathering (light) stabilizer, a mold release agent (a lubricant), and a crystalline nucleating agent, (B) 0 to 60 parts by weight of at least one selected from the group consisting of a reinforcing material, an electrically conductive material, a thermoplastic resin, and a thermoplastic elastomer, and (C) 0 to 5 parts by weight of a pigment.

As Component (A) of the antioxidant, hindered phenol type antioxidants are preferable. Specifically, they include, for example, n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], triethylene glycol-bis-[3-(3-t-butyl-5-methyl-4-hydroxyphenyl)-propionate], 2,2'-methylenebis-(4-methyl-t-butylphenol), tetrakis[methylene-3-(3',5'-di-t-butyl-4'-hydroxyphenyl)propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-4'-hydroxyphenyl)propionylhexamethylene diamine, N,N'-tetramethylene-bis-3-(3'-methyl-5'-t-butyl-4'-hydroxyphenol)propionyldiamine, N,N'-bis-[3-(3,5-di-t-butyl-4-hydroxyphenol)propionyl]hydrazine, N-salicyloyl-N'-salicylidene hydrazine, 3-(N-salicyloyl)amino-1,2,4-triazol, N,N'-bis[2-{3-(3,5-di-t-butyl-4-hydroxyphenyl)propionyloxy}ethyl]oxyamide, and the like; preferably, triethylene glycol-bis-[3-(3-t-butyl-5-methyl-4-hydroxyphenyl)-propionate] and tetrakis[methylene-3-(3', 5'-di-t-butyl-4'-hydroxyphenyl)propionate]methane. These antioxidants may be used alone or in combination. Further, the antioxidant is preferably formulated in an amount of 0.01 to 1 part by weight based on 100 parts by weight of the polyoxymethylene copolymer.

Examples of Component (A) of the polymer or the compound containing formaldehyde reactive nitrogen include polyamide resins such as nylon 4-6, nylon 6, nylon 6-6, nylon 6-10, nylon 6-12 and nylon 12, and copolymers thereof such as nylon 6/6-6/6-10 and nylon 6/6-12. Further, there can be exemplified a copolymer comprising acrylamide and a derivative thereof, a copolymer comprising acrylamide, a derivative thereof and other vinyl monomers, and a compound containing a formaldehyde reactive nitrogen atom having an amino substituent. As examples of the copolymer comprising acrylamide, a derivative thereof and other vinyl monomers, poly-β-alanine copolymer obtained by polymerizing acrylamide, a derivative thereof and other vinyl monomers in the presence of metallic alcoholate can be exemplified. Moreover, as examples of the compound containing formaldehyde reactive nitrogen atom having an amino substituent, there can be exemplified triazine derivatives such as guanamine(2,4-diamino-sym-triazine), melamine(2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N',N"-trimethylolmelamine, benzoguanamine(2,4-diamino-6-phenyl-sym-triazine), acetoguanamine(2,4-diamino-6-methyl-sym-triazine), 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, N,N,N',N'-tetracyanoethyl benzoguanamine, succinoguanamine, ethylene dimelamine, triguanamine, melamine cyanurate, ethylene dimelamine cyanurate, triguanamine cyanurate, ammeline, and acetoguanamine. These polymers or compounds containing formaldehyde reactive nitrogen may be used alone or in combination. Among the above polymers or compounds containing formaldehyde reactive nitrogen, a polyamide resin is preferable. The resin is formulated in an amount of 0.01 to 1 part by weight based on 100 parts by weight of the polyoxymethylene resin.

As Component (A) of the catching agents of formic acid, there can be exemplified the above amino-substituted triazine, a co-condensation product of the amino-substituted triazine and formaldehyde, for instance, a polycondensation product of melamine and formaldehyde, and the like. As other catching agents of formic acid, there can be exemplified a hydroxide, an inorganic acid salt, a carboxylic acid salt or an alkoxide of an alkali metal or an alkali earth metal. For instance, they include hydroxide of sodium, potassium, magnesium, calcium and barium, and carbonate, phosphate, silicate, borate and carboxylate of the above metals. As the carboxylic acid, saturated or unsaturated aliphatic carboxylic acids having 10 to 36 carbon atoms are preferable, and these carboxylic acids may be substituted with hydroxyl groups. As the aliphatic carboxylic acids, a capric acid, an undecylic acid, a lauric acid, a tridecylic acid, a myristic acid, a pentadecylic acid, a palmitic acid, a heptadecylic acid, a stearic acid, a nanodecanoic acid, an arachic acid, a behenic acid, a lignoceric acid, a cerotic acid, a heptacosanoic acid, a montanoic acid, a melissic acid, a lacceric acid, an undecylenic acid, an oleic acid, an elaidic acid, a cetoleic acid, an erucic acid, abrassidic acid, asorbic acid, alinoleic acid, alinolenic acid, an arachidonic acid, a propiolic acid, a stearolic acid, a 12-hydroxydodecanoic acid, a 3-hydroxydecanoic acid, a 16-hydroxyhexadecanoic acid, a 10-hydroxyhexadecanoic acid, a 12-hydroxyoctadecanoic acid, a 10-hydroxy-8-octadecanoic acid, a dl-erythro-9,10-dihydroxyoctadecanoic acid, and the like. Among them, a dialiphatic calcium derived from a $C_{12}$–$C_{22}$ aliphatic acid is preferable. Specific examples include calcium dimyristate, calcium dipalmitate, calcium diheptadecylate, calcium distearate, calcium(myristate-palmitate), calcium(myristate-stearate), calcium(palmitate-stearate), and the like. And, particularly preferred is calcium dipalmitate, calcium diheptadecylate, and calcium distearate. In the present invention, it is particularly effective to formulate 0.01 to 0.2 parts by weight of at least two selected from the group consisting of the above-described calcium salt of a dialiphatic acid derived from $C_{12}$–$C_{22}$ aliphatic acid based on 100 parts by weight of the polyoxymethylene copolymer.

Component (A) of the weathering (light) stabilizers is preferably one or at least two selected from the group consisting of benzotriazole type substances, anilide oxalate type substances and hindered amine type substances.

Examples of the benzotriazole type substances include 2-(2'-hydroxy-5'-methyl-phenyl)benzotriazole, 2-(2'-hydroxy-3,5-di-t-butyl-phenyl)benzotriazole, 2-[2'-hydroxy-3,5-bis(α,α-dimethylbenzyl)phenyl]benzotriazole, 2-(2'-hydroxy-3,5-di-t-amylphenyl)benzotriazole, 2-(2'-hydroxy-3,5-di-isoamyl-phenyl)benzotriazole, 2-[2'-hydroxy-3,5-bis-(α,α-dimethylbenzyl)phenyl]-2H-benzotriazole, 2-(2'-hydroxy-4'-octoxyphenyl)

benzotriazole, and the like. Examples of the anilide oxalate type substances include 2-ethoxy-2'-ethyloxalic acid bisanilide, 2-ethoxy-5-t-butyl-2'-ethyloxalic acid bisanilide, 2-ethoxy-3'-dodecyloxalic acid bisanilide, and the like. These substances may be used alone or in combination.

Examples of the hindered amine type substances include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-teteramethyl-4-piperidyl)-carbonate, bis(2,2,6,6-tetramethyl-4-piperidyl)-oxalate, bis(2,2,6,6-tetramethyl-4-piperidyl)-malonate, bis(1,2,2,6,6-pentamethyl-4-piperidinyl)sebacate, bis-(N-methyl-2,2,6,6-tetramethyl-4-piperidinyl)sebacate, bis(2,2,6,6-teteramethyl-4-piperidyl)-sebacate, bis(2,2,6,6-teteramethyl-4-piperidyl)-adipate, bis(2,2,6,6-teteramethyl-4-piperidyl)-terephthalate, 1,2-bis(2,2,6,6-teteramethyl-4-piperidyloxy)-ethane, α-α'-bis(2,2,6,6-teteramethyl-4-piperidyloxy)-p-xylene, bis(2,2,6,6-teteramethyl-4-piperidyl)tolylene-2,4-dicarbamate, bis(2,2,6,6-teteramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethyl-piperidine, a condensate of 1,2,3,4-butane tetracarboxylic acid, 1,2,2,6,6-pentamethyl-4-piperidinol and β,β,β',β'-tetramethyl-3,9-[2,4,8,10-tetraoxaspiro(5,5)undecane] diethanol, and the like. The above hindered amine type substances may be used alone or in combination.

Among the above, preferable weathering agents are 2-[2'-hydroxy-3,5-bis(α,α-dimethylbenzyl)phenyl]benzotriazole, 2-(2'-hydroxy-3,5-di-t-butylphenyl)benzotriazole, 2-(2'-hydroxy-3,5-di-t-amylphenyl]benzotriazole, bis(1,2,2,6,6-pentamethyl-4-piperidinyl)sebacate, bis-(N-methyl-2,2,6,6-tetramethyl-4-piperidinyl)sebacate, bis(2,2,6,6-tetramethyl-4-piperidinyl)sebacate, and a condensate of 1,2,3,4-butane tetracarboxylic acid, 1,2,2,6,6-pentamethyl-4-piperidinol and β,β,β',β'-tetramethyl-3,9-[2,4,8,10-tetraoxaspiro(5,5) undecane]diethanol. These weathering (light) stabilizers are preferably formulated in an amount of 0.1 to 1 part by weight based on 100 parts by weight of the polyoxymethylene copolymer.

As Component (A) of the mold release agent, there can be exemplified an alcohol, an aliphatic acid, and an ester thereof, polyoxyalkylene glycol, an olefin compound having an average polymerization degree of 10 to 5000, a silicone, and the like. Of these, an ester of ethylene glycol and a dialiphatic acid derived from a $C_{12}$–$C_{22}$ aliphatic acid is preferable; ethylene glycol distearate, ethylene glycol dipalmitate, and ethylene glycol diheptadecylate are particularly preferable. In the present invention, it is particularly effective to formulate 0.01 to 0.9 part by weight of at least two types selected from the group consisting of the esters of ethylene glycol and a dialiphatic acid derived from $C_{12}$–$C_{22}$ aliphatic acids based on 100 parts by weight of the polyoxymethylene copolymer.

As Component (A) of the crystalline nucleating agent, there can be exemplified boron nitride, talc, mica, alumina, a compound of boric acid, and the like. These crystalline nucleating agents are preferably formulated in an amount of 0.01 to 0.1 part by weight based on 100 parts by weight of the polyoxymethylene copolymer.

In the present invention, there may formulate, to the polyoxymethylene copolymer so long as the formulation is not detrimental to the gist of the present invention, Component (B) of the reinforcing agent represented-by an inorganic filler, a glass fiber, glass beads, a carbon fiber and the like; an electrically conductive material represented by an electrically conductive carbon black, metallic powder, a fiber, and the like; a thermoplastic resin represented by a polyolefin resin, an acrylic resin, a styrenic resin, a polycarbonate resin, an uncured epoxy resin, modified products thereof, and the like; a thermoplastic elastomer represented by a polyurethane type elastomer, a polyester type elastomer, a polystyrene type elastomer, a polyamide type elastomer, and the like. These Components (B) are preferably formulated in an amount of 10 to 40 parts by weight based on 100 parts by weight of the polyoxymethylene copolymer.

To the polyoxymethylene resin composition, there can formulate Component (C) of an inorganic pigment represented by zinc sulfide, titanium oxide, barium sulfate, titanium yellow and cobalt blue; and an organic pigment represented by the types of condensed azo, perinone, phthalocyanine and monoazo; and the like.

Component (C) of a pigment of the present invention is used in an amount of 0 to 5 parts by weight, preferably 0.1 to 1 part by weight based on 100 parts by weight of the polyoxymethylene copolymer. When it is more than 5 parts by weight, thermal stability is unfavorably decreased.

The polyoxymethylene copolymer and the composition thereof of the present invention have excellent stiffness and extremely high thermal stability. Further, they can be subjected to a high cyclic molding since a crystallization period thereof is short. Moreover, they are favorably usable for various parts required for dimensional accuracy since they exhibit less secondary shrinkage. Furthermore, since they have excellent gas barrier properties to organic solvent gases, they are suitably applied to such an use that requires a material property of low gas permeable properties to organic solvent gases, for instance, fuel related parts of an automobile.

The polyoxymethylene copolymer and the composition thereof of the present invention which have various merits as above described are superior to the conventional polyoxymethylene resins and are excellent in various physical properties.

The present invention provides not only a polyoxymethylene copolymer having excellent properties and a composition thereof as stated above, but also provides molded products obtainable by subjecting the polyoxymethylene copolymer and the composition thereof to injection molding, extrusion molding, blow molding or pressure molding for utilizing their excellent properties. Further, it provides a part obtainable by subjecting the polyoxymethylene resin composition to injection molding, extrusion molding, blow molding, or pressure molding, or further subjecting the molded product to processing of cutting after the molding; a working part such as a gear, a cam, a slider, a lever, an arm, a clutch, a joint, an axis, a bearing, a key-stem, a key-top, a shutter, a reel, a part mating and sliding with a leading screw which drives a pick-up for an optical disc drive, a gear which rotates a leading screw, a rack gear which drives a pick-up, and a gear which mates with the rack gear and drives it; a resinous part by outsert molding; a resinous part by insert molding; a chassis; a tray; a side plate; and the like.

EXAMPLES

Hereinafter, the present invention is more specifically described referring to Examples and Comparative Examples. First, the terms and measuring method used in the Examples and Comparative Examples are explained below.

(1) Melting Point (°C.)

Using a differential scanning calorimeter (DSC-2C, manufactured by PerkinElmer, Inc.), a sample was once heated up to 200° C. and melted and then cooled down to 100° C., the sample was again heated at a rate of 2.5° C./min, and a peak temperature of an exothermic spectrum generated during this step was defined as a melting point.

(2) Crystallization Rate (Second)

5 mg of pellets was formed into a film by heat pressing. The film was heated from a room temperature to 200° C. using a DSC measuring apparatus (DSC-2C, manufactured by PerkinElmer, Inc.), and was maintained for 2 minutes to remove thermal strain. Then, it was cooled down to 150° C. at a rate of 80° C./min and was kept at the temperature of 150° C. A period between the time when the film temperature reached 150° C. and a time when a crystallized exothermic spectrum was observed.

(3) Concentration of Boron Trifluoride (ppm)

After a polyoxymethylene copolymer was thermally decomposed with 1N HCl, a fluorine concentration in the polyoxymethylene copolymer was measured using a fluorine ionic electrode (manufactured by HORIBA, Ltd.) and was converted in terms of a concentration of boron trifluoride.

(4) Oligomer Amount (ppm)

A polyoxymethylene copolymer was frozen and powdered. 10 g of the powdered polyoxymethylene copolymer was subjected to 24 hour Soxhlet extraction using 150 ml of a chloroform solution, and the extract was weighed. At the same time, the number of hydrogen derived from oxymethylene units in the extracted component was determined by proton NMR to obtain an amount of oligomer.

(5) Flexural Modulus ($kg/cm^2$)

Using an injection molding machine IS-80A manufactured by Toshiba Corp., a specimen was prepared under the conditions of a cylinder temperature of 200° C., an injection pressure of 60 $kgf/cm^2$, an injection period of 15 seconds, a cooling period of 25 seconds, and a mold temperature of 70° C. A flexural modulus of the specimen was measured according to ASTMD790.

(6) Formaldehyde Gas Generation Rate (ppm/min)

In a nitrogen flow, a formaldehyde gas generated from the polyoxymethylene copolymer at 230° C. in 90 minutes was absorbed by water and titrated to measure a generated amount. The total formaldehyde amount measured was divided by 90 minutes to calculate an average formaldehyde gas generation rate per minute (ppm/min). The slower the formaldehyde gas generation rate is, the more excellent the thermal stability is.

(7) Secondary Shrinkage (%)

Specimens were prepared using the same injection molding machine under the same molding conditions as those for the measurement of the flexural modulus. After the molding was finished, one of the specimens was left for 48 hours under the circumstance of a temperature of 23° C. and a humidity of 50%, and its size in the flow direction was defined as $D_1$ (mm). The other of the specimens was left for 72 hours under the circumstance of a temperature of 23° C. and a humidity of 50%, was heated for 5 hours at 80° C., and was left for 48 hours under the circumstance of a temperature of 23° C. and a humidity of 50%, and then its size in the flow direction was defined as $D_2$ (mm). According to the following equation, the secondary shrinkage (%) was calculated.

Secondary Shrinkage (t)=$(D_1-D_2)$/Mold Size×100 wherein the mold size is 130 mm and the thickness is 3 mm. The smaller the value is, the more excellent the secondary shrinkage is.

(8) Gas Permeability ($g·mm/day/m^2$)

A specimen having a thickness of 2 mm was prepared using the same injection molding machine under the same injection conditions as those for the measurement of the flexural modulus. A stainless steel cylindrical container having a diameter of 38 mm filled with an organic solvent (comprising a gasoline, a gasoline with a methanol concentration of 15 vol %, and methanol) was closed with the specimen. Between the cylindrical container and the specimen, a packing was inserted so that the organic solvent gas not be lost by other ways than permeation through the specimen. The cylindrical container as above prepared was left at 60° C. for 750 hours, and a reduced amount (g) of the organic solvent was measured. Based on the reduced amount measured, a gas amount which permeates a specimen having an area of 1 $m^2$ and a thickness of 1 mm per day was obtained by calculation and was defined as gas permeability ($g·mm/day/m^2$). The smaller the value is, the more excellent the gas barrier property is.

(9) Acetaldehyde Content in 1,3-dioxolane (ppm)

Using a gas chromatography equipped with a capillary column (PoraPlot Q manufactured by GL Science, Inc.), the acetaldehyde content in 1,3-dioxolane was measured with a hydrogen flame ion detector.

(10) % and ppm

Unless otherwise mentioned, they are all based on a weight.

Example 1

A twin-screw paddle type reactor for continuous polymerization equipped with a jacket capable of transferring a thermal medium was set at 80° C. Trioxane, 1,3-dioxolane having an acetaldehyde content of 100 ppm (0.015 mol based on 1 mol of trioxane) as a comonomer, and methylal ($0.7 \times 10^{-3}$ mol based on 1 mol of trioxane) as a molecular weight regulator were fed thereinto continuously at a rate of 12 kg/Hr, 148 g/Hr and 7.1 g/Hr, respectively. Polymerization was carried out by further continuously feeding a cyclohexane solution containing 1% by weight of boron trifluoride di-n-butyl etherate as a polymerization catalyst at a rate of 39.6 g/Hr so that the boron trifluoride was $1.5 \times 10^{-5}$ mol based on 1 mol of trioxane. The polyoxymethylene copolymer discharged from a mixer was fed into a 0.1% triethylamine solution to inactivate the polymerization catalyst. After the inactivated polyoxymethylene copolymer was filtered using a centrifugal separator, 1 part by weight of a solution containing hydroxycholine formate (trimethyl-2-hydroxyethyl ammonium formate) was added as a quaternary ammonium compound to 100 part by weight of the filtered polyoxymethylene copolymer, and they were mixed uniformly followed by drying at 120° C. The added amount of hydroxycholine formate was 20 ppm in terms of an amount of nitrogen. The added amount of hydroxycholine formate was adjusted by controlling the concentration of hydroxycholine formate in the solution containing hydroxycholine formate to be added. Based on 100 parts by weight of the polyoxymethylene copolymer dried, 0.3 parts by weight of triethylene glycol-bis-[3-(3-t-butyl-5-methyl-4-hydroxyphenyl)-propionate] was added as an antioxidant, and the mixture thereof was fed into a twin-screw extruder equipped with a vent. Based on 100 parts by weight of the melted polyoxymethylene copolymer in the extruder, 0.5 parts by weight of water was added to carry out the decomposition of unstable terminal groups wherein temperature of the extruder was set at 200° C. and the retention time in the extruder was 5 minutes. The polyoxymethylene copolymer, of which unstable terminal groups had been decomposed, was devolatized under a vent vacuum degree of 20 Torr, and was pelletized after being extruded from the dice part of the extruder as a strand. To 100 parts by weight of the thus-obtained pellets, 0.1 parts by weight of calcium distearate, 0.05 parts by weight of calcium dipalmitate, 0.05 parts by weight of nylon 66, 0.025 parts by weight of ethylene glycol distearate and 0.005 parts by weight of ethylene glycol dipalmitate were further added, and they were melt mixed by a single-screw extruder with a vent to obtain ultimate polyoxymethylene copolymer pellets.

A melting point, a crystallization period, a concentration of boron trifluoride, an oligomer amount, a flexural modulus, a formaldehyde gas generation rate, secondary shrinkage and gas permeability of the thus-obtained polyoxymethylene copolymer were shown in Table 1.

Examples 2 to 5 and Comparative Examples 1 to 3

The same experiments as in Example 1 were carried out in Examples 2 to 5 and Comparative Examples 1 to 3 except to change amounts of the comonomer and the polymerization catalyst used. The results are shown in Table 1 together with those of Example 1.

Example 6

The same experiment as in Example 1 was carried out except that 1,3-dioxolane having an acetaldehyde content of 1500 ppm was used. The results are shown in Table 1.

Example 7

The same experiment as in Example 1 was carried out except that 0.1 part by weight of calcium distearate and 0.05 parts by weight of calcium dipalmitate in Example 1 were replaced with 0.15 parts by weight of calcium distearate, and 0.025 parts by weight of ethylene glycol distearate and 0.005 parts by weight of ethylene glycol dipalmitate in Example 1 were replaced with 0.03 parts by weight of ethylene glycol distearate. The results are shown in Table 1.

Example 8

The same experiment as in Example 1 was carried out except that 1,3-dioxolane having an acetaldehyde content of 2100 ppm was employed. The results are shown in Table 1.

Comparative Example 4

The same experiment as in Example 1 was carried out except that ethylene oxide was employed as a comonomer, the amount of the polymerization catalyst was changed, and an oligomer amount was changed to be outside of the range defined in the present invention. The results are shown in Table 1.

Comparative Example 5

Table 1 also shows a flexural modulus, a formaldehyde gas generation rate, secondary shrinkage and gas permeability of a polyoxymethylene homopolymer (Tenac® 5010 manufactured by Asahi Chemical Industry Co., Ltd.).

The above Examples and Comparative Examples clearly show that a composition having a melting point not lower than 167° C. and not higher than 173° C. and an oligomer amount of not more than 5000 ppm exhibits excellent stiffness, extremely excellent thermal stability, low secondary shrinkage, and low gas permeability.

Examples 9 to 11

Examples 9 and 10 were carried out according to the same procedure as in Example 1 except that the used amount of hydroxycholine formate was changed. Further, Example 11 was carried out according to the same procedure as in Example 1 except that hydroxycholine formate was changed to hydroxytriethyl choline formate (triethyl-2-hydroxyethylammonium formate).

Table 2 shows a melting point, a crystallization period, a concentration of boron trifluoride, an oligomer amount, a flexural modulus, a formaldehyde gas generation rate, a secondary shrinkage and a gas permeability of the thus-obtained polyoxymethylene copolymer.

Comparative Example 6

The same procedure as in Example 1 was carried out except that a heat treatment of the unstable terminal groups as described below was conducted without adding hydroxycholine formate. Heat Treatment of Unstable Terminal Groups:

To 100 parts by weight of the dried polyoxymethylene copolymer, 0.3 parts by weight of triethylene glycol-bis-[3-(3-t-butyl-5-methyl-4-hydroxyphenyl)-propionate] was added as an antioxidant, and fed to a twin-screw extruder with a vent. To 100 parts by weight of the polyoxymethylene copolymer melted in the extruder, 3 parts by weight of 20% triethylamine solution was added to conduct decomposition of unstable terminal groups under the conditions that a temperature of the extruder was set at 200° C. and a detention time in the extruder was 5 minutes.

Examples 9 to 11 and Comparative Example 6 show that unless the decomposition of the unstable terminal groups is carried out by adding the quaternary ammonium compound, the oligomer amount increases and the stiffness decreases. In addition, the thermal stability becomes inferior. Further, it is known that the secondary shrinkage and the gas barrier property (inverse of gas permeability) are also deteriorated.

TABLE 1

| | Type of comonomer | Amount of comonomer (mol/mol trioxane) | Melting Point (° C.) | Crystallization rate (sec) | Boron trifluoride (ppm) | Amount of oligomer (ppm) | Flexural modulus (kg/cm$^2$) | Formaldehyde gas generation rate (ppm/min) | Secondary shrinkage (%) | Gas Permeability (g · mm/day/m$^2$) | | |
|---|---|---|---|---|---|---|---|---|---|---|---|---|
| | | | | | | | | | | Gasoline | 15 vol % methanol gasoline | Methanol |
| Ex. 1 | 1,3-dioxolane | 0.015 | 168.2 | 48 | 12 | 2600 | 27500 | 5.4 | 0.04 | 0 | 15 | 14 |
| Ex. 2 | 1,3-dioxolane | 0.02 | 167.2 | 55 | 11 | 3000 | 26800 | 4.8 | 0.03 | 0 | 14 | 13 |

TABLE 1-continued

|  | Type of comonomer | Amount of co-monomer (mol/mol trioxane) | Melting Point (° C.) | Crystallization rate (sec) | Boron trifluoride (ppm) | Amount of oligomer (ppm) | Flexural modulus (kg/cm$^2$) | Formaldehyde gas generation rate (ppm/min) | Secondary shrinkage (%) | Gas Permeability (g · mm/day/m$^2$) | | |
|---|---|---|---|---|---|---|---|---|---|---|---|---|
|  |  |  |  |  |  |  |  |  |  | Gasoline | 15 vol % methanol gasoline | Methanol |
| Ex. 3 | 1,3-dioxolane | 0.01 | 169.4 | 43 | 13 | 2800 | 28500 | 6.8 | 0.05 | 0 | 14 | 14 |
| Ex. 4 | 1,3-dioxolane | 0.005 | 170.4 | 35 | 13 | 2500 | 29500 | 6.3 | 0.04 | 0 | 15 | 13 |
| Ex. 5 | 1,3-dioxolane | 0.002 | 172.6 | 26 | 13 | 2600 | 31000 | 9.2 | 0.05 | 0 | 14 | 14 |
| Ex. 6 | 1,3-dioxolane | 0.015 | 168.3 | 49 | 12 | 2900 | 27400 | 6.2 | 0.04 | 0 | 16 | 15 |
| Ex. 7 | 1,3-dioxolane | 0.015 | 168.2 | 48 | 13 | 2600 | 27500 | 5.3 | 0.05 | 0 | 16 | 17 |
| Comp. Ex. 1 | 1,3-dioxolane | 0.036 | 163.1 | 90 | 12 | 2500 | 24600 | 4.3 | 0.1 | 5 | 30 | 33 |
| Comp. Ex. 2 | 1,3-dioxolane | 0.001 | 173.1 | 22 | 15 | 2900 | 31500 | 23 | 0.15 | 1 | 20 | 21 |
| Comp. Ex. 3 | 1,3-dioxolane | 0.02 | 167.2 | 85 | 36 | 5100 | 24700 | 15.4 | 0.11 | 0 | 22 | 23 |
| Ex. 8 | 1,3-dioxolane | 0.015 | 168.3 | 61 | 14 | 4800 | 26700 | 8.8 | 0.07 | 0 | 17 | 18 |
| Comp. Ex. 4 | Ethylene oxide | 0.02 | 167.3 | 80 | 35 | 5800 | 24800 | 17.4 | 0.12 | 0 | 20 | 21 |
| Comp. Ex. 5 | Tenac ® homopolymer (5010) | | | | | | 33000 | 35 | 0.21 | 1 | 21 | 18 |

TABLE 2

|  | Type of quaternary ammonium compound | Amount of quaternary ammonium compound (in terms of nitrogen: ppm) | Melting Point (° C.) | Crystallization rate (sec) | Boron trifluoride (ppm) | Amount of oligomer (ppm) | Flexural modulus (kg/cm$^2$) | Formaldehyde gas generation rate (ppm/min) | Secondary shrinkage (%) | Gas Permeability (g · mm/day/m$^2$) | | |
|---|---|---|---|---|---|---|---|---|---|---|---|---|
|  |  |  |  |  |  |  |  |  |  | Gasoline | 15 vol % methanol gasoline | Methanol |
| Ex. 9 | Hydroxycholine formate | 1 | 168.2 | 50 | 12 | 2700 | 27400 | 5.9 | 0.04 | 0 | 13 | 14 |
| Ex. 10 | Hydroxycholine formate | 42 | 168.1 | 51 | 12 | 2500 | 27600 | 5.0 | 0.03 | 0 | 15 | 14 |
| Ex. 11 | Hydroxytriethyl choline formate | 20 | 168.1 | 52 | 12 | 2600 | 28000 | 5.8 | 0.04 | 0 | 14 | 13 |
| Comp. Ex. 6 | — | — | 168.2 | 90 | 12 | 5500 | 24600 | 21.2 | 0.11 | 0 | 20 | 21 |

Industrial Applicability

The polyoxymethylene copolymer of the present invention having a melting point not lower than 167° C. and not higher than 173° C. and an oligomer amount of not more than 5000 ppm, and the composition thereof not only exhibit a high crystallization rate, high stiffness and excellent thermal stability but also have excellent secondary shrinkage and gas barrier properties to organic solvent gases.

The present invention provides molded products obtainable by subjecting the polyoxymethylene copolymer or the composition thereof to injection molding, extrusion molding, blow molding, or pressure molding. Further, it provides parts obtainable by subjecting the polyoxymethylene copolymer or the composition thereof to injection molding, extrusion molding, blow molding, or pressure molding, or further subjecting the molded product to processing of cutting after the molding; a working part such as a gear, a cam, a slider, a lever, an arm, a clutch, a joint, an axis, a bearing, a key-stem, a key-top, a shutter, a reel, a part mating and sliding with a leading screw which drives a pick-up for an optical disc drive, a gear which rotates a leading screw, a rack gear which drives a pick-up, and a gear which mates with a rack gear and drives it; a resinous part by outsert molding; a resinous part by insert molding; a chassis; a tray; a side plate; and the like.

These parts are particularly used for office automation (OA) apparatuses represented by a printer and a copying machine; for cameras and video apparatuses represented by a video tape recorder (VTR), a video movie, a digital video camera, a camera and a digital camera; for apparatuses for music, image, or information represented by a cassette player, a laser disc (LD), a digital audio tape (DAT), a mini disc (MD), a compact disc (CD) [including CD-ROM (read only memory), CD-R (recordable) and CD-RW (rewritable)], a digital video disc (DVD) [including DVD-ROM, DVD-R, DVD-RW, DVD-RAM (random access memory) and DVD-Audio], other optical disc drives, a micro floppy disc (MFD), a magnet optical disc (MO), a navigation system, and a mobile personal computer; for telecommunication apparatuses represented by a cellular phone and a facsimile machine; for interior or exterior parts for an automobile such as fuel related parts represented by a gasoline tank, a fuel pump module, valves, and a gasoline tank flange, door related parts represented by a door lock, a door handle, a window regulator, and a speaker grille, seat belt related parts represented by a slip ring for a seat belt and a press bottom, parts for a combination switch, switches, and clips; and for miscellaneous industrial goods represented by a disposable camera, a toy, a fastener, a chain, a conveyor, a buckle, sporting goods, a vending machine, furniture, an instrument and an apparatus for house-building.

What is claimed is:

1. A polyoxymethylene copolymer having a melting point not lower than 167° C. and not higher than 173° C., wherein a low-molecular weight polyoxymethylene copolymer which is contained in the polyoxymethylene copolymer and is extractable with chloroform is not more than 5000 ppm, wherein the polyoxymethylene copolymer is what has been obtained through the heat treatment of unstable terminal groups comprised of the polyoxymethylene copolymer in the presence of at least one quaternary ammonium compound represented by the formula (1) below:

$$[R^1R^2R^3R^4N^+]_n X^{-n} \quad (1)$$

wherein:

each of $R^1$, $R^2$, $R^3$ and $R^4$ independently represents an unsubstituted or substituted $C_1$–$C_{30}$ alkyl group, a $C_6$–$C_{20}$ aryl group, an aralkyl group wherein an unsubstituted or substituted $C_1$–$C_{30}$ alkyl group is substituted with at least one $C_6$–$C_{20}$ aryl group, or an alkylaryl group wherein a $C_6$–$C_{20}$ aryl group is substituted with at least one unsubstituted or substituted $C_1$–$C_{30}$ alkyl group, wherein said unsubstituted or substituted alkyl group being linear, branched or cyclic, and said substituted alkyl group having at least one substituent selected from the group consisting of a halogen atom, a hydroxyl group, an aldehyde group, a carboxyl group, an amino group and an amide group, and wherein at least one hydrogen atom of each of said unsubstituted alkyl group, said aryl group, said aralkyl group and said alkylaryl group being optionally replaced by a halogen atom;

n represents an integer of from 1 to 3; and

X represents a hydroxyl group, or an acid residue of a $C_1$–$C_{20}$ carboxylic acid, a hydroacid excluding a hydrogen halide, an oxoacid, an inorganic thioacid or a $C_1$–$C_{20}$ organic thioacid.

2. The polyoxymethylene copolymer according to claim 1, wherein the polyoxymethylene copolymer has a melting point not lower than 167° C. and not higher than 171° C.

3. The polyoxymethylene copolymer according to claim 1, wherein a number-average molecular weight of the low-molecular weight polyoxymethylene copolymer is in the range of 100 to 500.

4. The polyoxymethylene copolymer according to claim 1, wherein the polyoxymethylene copolymer is what has been obtained through the heat treatment of unstable terminal groups comprised of the polyoxymethylene copolymer as defined by the following;

Heat treatment of unstable terminal groups:

the polyoxymethylene copolymer is subjected to heat treatment in a molten state at a temperature in the range of from the melting point of said polyoxymethylene copolymer to 260° C. in the presence of at least one quaternary ammonium compound represented by the formula (1) below:

$$[R^1R^2R^3R^4N^+]_n X^{-n} \quad (1)$$

wherein:

each of $R^1$, $R^2$, $R^3$ and $R^4$ independently represents an unsubstituted or substituted $C_1$–$C_{30}$ alkyl group, a $C_6$–$C_{20}$ aryl group, an aralkyl group wherein an unsubstituted or substituted $C_1$–$C_{30}$ alkyl group is substituted with at least one $C_6$–$C_{20}$ aryl group, or an alkylaryl group wherein a $C_6$–$C_{20}$ aryl group is substituted with at least one unsubstituted or substituted $C_1$–$C_{30}$ alkyl group, wherein said unsubstituted or substituted alkyl group being linear, branched or cyclic, and said substituted alkyl group having at least one substituent selected from the group consisting of a halogen atom, a hydroxyl group, an aldehyde group, a carboxyl group, an amino group and an amide group, and wherein at least one hydrogen atom of each of said unsubstituted alkyl group, said aryl group, said aralkyl group and said alkylaryl group being optionally replaced by a halogen atom;

n represents an integer of from 1 to 3; and

X represents a hydroxyl group, or an acid residue of a $C_1$–$C_{20}$ carboxylic acid, a hydroacid excluding a hydrogen halide, an oxoacid, an inorganic thioacid or a $C_1$–$C_{20}$ organic thioacid; in an amount of from 0.05 to 50 ppm by weight in terms of the amount of the nitrogen ascribed to the quaternary ammonium compound, based on the total weight of the polyoxymethylene copolymer and the quaternary ammonium compound, wherein the amount of the nitrogen is represented by the formula (2) below:

$$P \times 14/Q \quad (2)$$

wherein:

P represents the amount (ppm by weight) of the quaternary ammonium compound, based on the total weight of the polyoxymethylene copolymer and the quaternary ammonium compound, 14 is the atomic weight of nitrogen, and Q represents the molecular weight of the quaternary ammonium compound.

5. The polyoxymethylene copolymer according to claim 4, wherein X in the formula (1) represents a hydroxyl group, or the acid residue of a carbonic acid, a boric acid, a sulfuric acid, or a carboxylic acid.

6. The polyoxymethylene copolymer according to claim 5, wherein the carboxylic acid is at least one selected from the group consisting of formic acid, acetic acid and propionic acid.

7. The polyoxymethylene copolymer according to claim 4, wherein each of $R^1$, $R^2$, $R^3$ and $R^4$ in the formula (1) independently represents a $C_1$–$C_5$ alkyl group or a $C_2$–$C_4$ hydroxyalkyl group.

8. The polyoxymethylene copolymer according to claim 7, wherein at least one of said $R^1$, $R^2$, $R^3$ and $R^4$ in the formula (1) is a hydroxyethyl group.

9. The polyoxymethylene copolymer according to claim 1, wherein the polyoxymethylene copolymer is what has been obtained by copolymerizing trioxane as a main monomer and 1,3-dioxolane as a comonomer in the presence of at least one of cationic polymerization catalysts.

10. The polyoxymethylene copolymer according to claim 9, wherein the cationic polymerization catalyst is at least one selected from the group consisting of boron trifluoride, a hydride of boron trifluoride, and a complex compound coordinating an organic compound containing an oxygen

atom or a sulfur atom and boron trifluoride, and the polyoxymethylene copolymer is what has been obtained by copolymerization using said polymerization catalyst so as to be in an amount of not less than 3 ppm and not more than 30 ppm in terms of an amount of boron trifluoride based on the copolymer obtained.

11. A polyoxymethylene resin composition containing the polyoxymethylene copolymer according to claim 1, further comprising, based on 100 parts by weight of the polyoxymethylene copolymer, (A) 0.01 to 5 parts by weight of at least one selected from the group consisting of an antioxidant, a polymer or a compound containing formaldehyde reactive nitrogen, a catching agent of formic acid, a weathering (light) stabilizer, a mold release agent (a lubricant), and a crystalline nucleating agent, (B) 0 to 60 parts by weight of at least one selected from the group consisting of a reinforcing material, an electrically conductive material, a thermoplastic resin, and a thermoplastic elastomer, and (C) 0 to 5 parts by weight of a pigment.

12. The polyoxymethylene resin composition according to claim 11, wherein as the antioxidant, 0.01 to 1 parts by weight of a hindered phenol type antioxidant is formulated based on 100 parts by weight of the polyoxymethylene copolymer.

13. The polyoxymethylene resin composition according to claim 11, wherein as the polymer or the compound containing formaldehyde reactive nitrogen, 0.01 to 1 parts by weight of a polyamide resin is formulated based on 100 parts by weight of the polyoxymethylene copolymer.

14. The polyoxymethylene resin composition according to claim 11, wherein as the catching agent of formic acid, 0.01 to 0.2 parts by weight of at least two selected from the group consisting of calcium salts of a dialiphatic acid derived from a $C_{12}$–$C_{22}$ aliphatic acid is formulated based on 100 parts by weight of the polyoxymethylene copolymer.

15. The polyoxymethylene resin composition according to claim 11, wherein as the mold release agent, 0.01 to 0.9 parts by weight of at least two selected from the group consisting of esters of an ethylene glycol and a dialiphatic acid derived from a $C_{12}$–$C_{22}$ aliphatic acid is formulated based on 100 parts by weight of the polyoxymethylene copolymer.

16. A molded product obtainable by subjecting the polyoxymethylene resin composition according to claim 11, to injection molding, extrusion molding, blow molding, or pressure molding.

17. A part obtainable by subjecting the polyoxymethylene resin composition according to claim 11 to injection molding, extrusion molding, blow molding, or pressure molding, or by further subjecting the molded product to processing of cutting after the molding.

18. A part according to claim 17, wherein the part is at least one part selected from the group consisting of a working part, a resinous part by outsert molding, a resinous part by insert molding, a chassis, a tray, and a side plate.

19. A part according to claim 18, wherein the working part is at least one part selected from the group consisting of a gear, a cam, a slider, a lever, an arm, a clutch, a joint, an axis, a bearing, a key-stem, a key-top, a shutter, and a reel.

20. A part according to claim 18, wherein the working part is at least one part selected from the group consisting of a part mating and sliding with a leading screw which drives a pick-up for an optical disc drive, a gear which rotates a leading screw, a rack gear which drives a pick-up, and a gear which mates with and drives a rack gear.

21. A part according to claim 17, which is used for office automation apparatuses represented by a printer, and a copying machine.

22. A part according to claim 17, which is used for cameras or video apparatuses represented by a video tape recorder, a video movie, a digital video camera, a camera, and a digital camera.

23. A part according to claim 17, which is used for apparatuses for music, image, or information represented by a cassette player, a digital audio tape, a laser disc, a mini disc, a compact disc (including CD-ROM, CD-R, and CD-RW), a digital video disc (including DVD-ROM, DVD-R, DVD-RW, DVD-RAM, and DVD-Audio), other optical disc drives, a micro floppy disc, a magnet optical disc, a navigation system, and a mobile personal computer.

24. A part according to claim 17, which is used for telecommunication apparatuses represented by a cellular phone, and a facsimile machine.

25. A part according to claim 17, which is used for an interior or exterior part for an automobile.

26. A part according to claim 25, wherein an interior or exterior part for an automobile is at least one part selected from the group consisting of fuel related parts represented by a gasoline tank, a fuel pump module, valves, and a gasoline tank flange; door related parts represented by a door lock, a door handle, a window regulator, and a speaker grille; a seat belt related parts represented by a slip ring and a press button for a seat belt; parts for a combination switch, switches, and clips.

27. A part according to claim 17, which is used for miscellaneous industrial goods represented by a disposable camera, a toy, a fastener, a chain, a conveyer, a buckle, sporting goods, a vending machine, a furniture, an instrument, and an apparatus for house-building.

28. The polyoxymethylene copolymer according to claim 1, wherein the polyoxymethylene copolymer is what has been obtained by copolymerization of trioxane and 1,3-dioxolane in an amount of 0.0015 to 0.025 mol based on 1 mol of trioxane in the presence of at least one polymerization catalyst selected from the group consisting of boron trifluoride, a hydride of boron trifluoride, and a complex compound coordinating an organic compound containing an oxygen atom or a sulfur atoms and boron trifluoride.

29. The polyoxymethylene copolymer according to claim 28, wherein the amount of 1,3-dioxolane in the copolymerization is 0.002 to 0.02 mol based on 1 mol of trioxane.

30. The polyoxymethylene copolymer according to claim 28, wherein 1,3-dioxolane has an acetaldehyde content of not higher than 2000 ppm.

31. The polyoxymethylene copolymer according to claim 28, wherein the amount of polymerization catalyst in the copolymerization is not less than 3 ppm and not more than 30 ppm in terms of an amount of boron trifluoride based on the copolymer obtained.

* * * * *